United States Patent [19]

Sakai et al.

[11] Patent Number: 4,815,007
[45] Date of Patent: Mar. 21, 1989

[54] APPARATUS FOR CONTROLLING A ROBOT

[75] Inventors: Kenji Sakai; Kazuo Sugawara, both of Suwa, Japan

[73] Assignee: Seiko Epson Corporation, Tokyo, Japan

[21] Appl. No.: 166,767

[22] Filed: Mar. 3, 1988

Related U.S. Application Data

[63] Continuation of Ser. No. 810,625, Dec. 19, 1985, abandoned.

[30] Foreign Application Priority Data

Dec. 20, 1984 [JP] Japan ................................ 59-269413
Oct. 1, 1985 [JP] Japan ................................ 60-218224

[51] Int. Cl.⁴ ...................... B25J 13/00; G05B 19/18
[52] U.S. Cl. .............................. 364/513; 364/167.01; 318/568; 318/571
[58] Field of Search ................................ 364/167-170, 364/174, 180, 182, 191, 474, 475, 513; 318/568, 570, 571, 573, 574, 590, 592

[56] References Cited

U.S. PATENT DOCUMENTS

| | | | |
|---|---|---|---|
| 4,250,438 | 2/1981 | Onoda ................................ | 364/174 |
| 4,475,160 | 10/1984 | Inaba ................................ | 364/513 |
| 4,587,618 | 5/1986 | Oguchi ................................ | 364/513 |
| 4,600,985 | 7/1986 | Nozawa et al. ................................ | 364/169 |

Primary Examiner—Allen MacDonald
Attorney, Agent, or Firm—Blum Kaplan

[57] ABSTRACT

A robot control apparatus provides shortened operating times for movement of a robot member, such as an arm, hand, or the like, without accelerating the movements so as to unduly stress the robot, by beginning movement of the member in a second direction when motion in a first direction has been decelerated to a predetermined level. The process is repeated, when a third movement is involved, with the third movement being initiated, for example, when the second movement has decelerated to an appropriate level. An inhibit control is provided for inhibiting motion of the robot arm in the event of faulty parts preparation, mislocation of a part, or when an obstruction is present.

30 Claims, 5 Drawing Sheets

ACCELERATION-DECELERATION TABLE IN MEMORY

| NUMBER OF PULSES REQUIRED FOR BASIC ACCELERATION AND DECELERATION |
|---|
| $t_1$ DATA |
| $t_2$ DATA |
| ⋮ |
| $t_n$ DATA |
| TERMINATOR |

FIG.9a

DRIVING PULSE

APPARATUS FOR CONTROLLING A ROBOT

This is a continuation of application Ser. No. 06/810,625, filed on Dec. 19, 1985, abandoned.

BACKGROUND OF THE INVENTION

This invention relates to an apparatus for controlling a robot. More particularly, the invention relates to an apparatus for controlling the movement of a robot which has a first drive axis for supporting motion of a robot member, such as an arm, hand, or the like, in a vertical direction, and one or more second drive axes for supporting motion of the robot member in a horizontal direction.

Figure 1A:
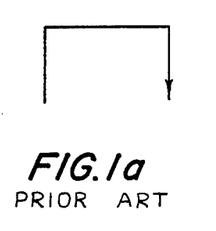
FIG. 1(a) is a schematic representation of the locus of movements of the tip of a robot member in a pick-and-place operation under the control of a prior art control apparatus.

Generally speaking, in controlling the operation of a robot member as it performs, for example, a so-called pick-and-place movement for moving an object from a home position to another location, the object is first grasped and then moved. In moving the object, the robot member is first lifted in a vertical direction, hereinafter referred to as the "Z axis". The member is then moved horizontally in a lateral direction, hereinafter known as the "X-Y axes". Finally, the member is caused to descend, again moving along the Z axis. These motions are shown in FIG. 1(a) of the drawings. In conventional robot control systems which perform the aforesaid motions, there is a single movement control circuit which has a calculating function and the pick-and-place operation is divided into three steps, each successive step being performed after completion of the preceding step. Thus, after the ascending movement along the Z axis has accelerated the robot member and then decelerated it to a halt, the member is accelerated along the X-Y axes. When the movement along the X-Y axes has been subsequently decelerated and stopped, the process is again repeated for descending movement of the member along the Z axis.

The foregoing method of operating a robot member, such as an arm or hand, is time consuming. In order to reduce the time of operation, it is desirable to speed up the operation. However, increases in rates of acceleration and in velocities of movement beyond reasonable limits have an adverse effect on the life of the robot. Heretofore, however, in conventional systems where each step is performed in turn as described above, increasing the acceleration and the velocity has been the only way known for speeding up the operation of the robot. As a result of such speed-ups, either the life of the robot has been substantially shortened or substantial structural hardening of the mechanism has been required at considerable cost in order to extend the life of the mechanism.

Another problem is encountered in the operation of some conventional robot drive apparatuses in which a pulse train from a drive control circuit is used to turn the drive shaft, in that the next operation in a sequence is initiated without assurance that rotation of the drive shaft has completely stopped. The result has been a delay in the time required by the robot member to position an object. Further, in the systems of this kind it is difficult to obtain a high degree of positioning accuracy.

SUMMARY OF THE INVENTION

The foregoing problems and others which will become apparent during a reading of the below-appended specification and claims are solved in an apparatus for controlling the movement of a robot member where movement in one direction is begun during the deceleration of movement in a second direction, but before the movement in the second direction has been stopped. In accordance with the present invention, an apparatus for controlling a robot is provided which has a vertical movement control circuit for driving a movable robot member, such as an arm, hand, or the like, in motion along a drive axis in a first direction, and a horizontal movement control circuit for driving the robot member in motion along at least one second drive axis. To expedite performance of, for example, movements along each of the first and second axes, the first control circuit, after moving the robot member a predetermined distance along the first axis, generates a timing signal which initiates motion of the robot member along the second axis. In this way, the movement of the member along the first axis can first be accelerated and then decelerated to a predetermined level at which time, and before the deceleration is completed, acceleration of the member in the second direction is undertaken so that undue stress is not placed upon the structure of the robot.

In a robot control apparatus which, for example, performs a pick-and-place operation, the principal of operation just described is employed to speed the transition from upwards motion of the robot member to lateral motion and, again, to speed the transition from motion in the lateral direction to downward motion, thereby accomplishing the moves required for transfer of an object from one location to another.

By performing the successive motion of the robot member as described, the operating time required for the illustrative pick-and-place operation is considerably reduced.

The apparatus of the invention also includes an inhibit circuit for inhibiting movement of the robot member upon receipt of a fault signal.

It is an object of the the invention, therefore, to reduce the time required to move a movable member of a robot in a plurality of directions in succession, without increasing the speed of movement of the member.

Another object of the invention is to provide a robot control circuit having a plurality of movement controlling circuits so as to avoid dragging or hitching of work pieces.

Still another object of the invention is to provide a circuit for controlling movement of a movable robot member in successive different directions in which timing signals are passed between the movement controlling circuits to prevent error and reduce the time of movement.

A still further object of the invention is to provide means for changing the locus of movement of a robot member in response to detection of an external fault or obstruction, without dividing or stopping the operation in mid-course.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 9c is a chart showing approximated velocity curves of robot member movement produced by use of the acceleration-deceleration table of FIG. 9a.

DETAILED DESCRIPTION OF THE SPECIFICATION

Figure 1B:
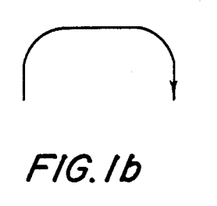
FIG. 1(b) is a schematic representation of the locus of movements of the tip of a robot member in a pick-and-place operation under the control of the control apparatus of the present invention.
Figure 2A:
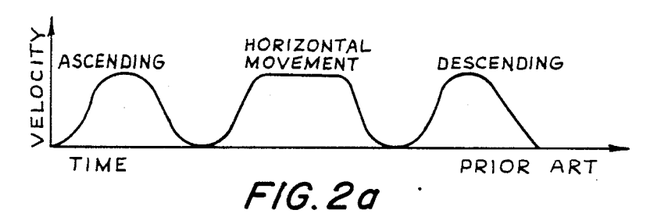
FIGS. 2(a) and 2(b) show the relationship between the velocities of movement of a robot member and time when the robot member is performing the pick-and-place operation of FIGS. 1(a) and 1(b), respectively.
Figure 2B:
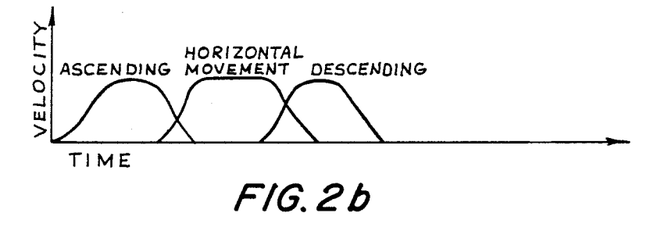

In accordance with the invention, a movable robot member, such as an arm or hand, is controlled by means of a circuit in which a plurality of movements are performed simultaneously, thereby speeding up operation of the robot. As shown in FIG. 1(b), horizontal movement along the X-Y axis is begun before an ascending movement along the Z axis is completed, and descending movement along the Z axis is begun before movement along the X-Y axes is completed. As shown in FIG. 2(b), the robot performs the pick-and-place operation without the interruptions of the prior art (FIG. 2a), thereby considerably reducing the time required to perform the operation.

Figure 3:
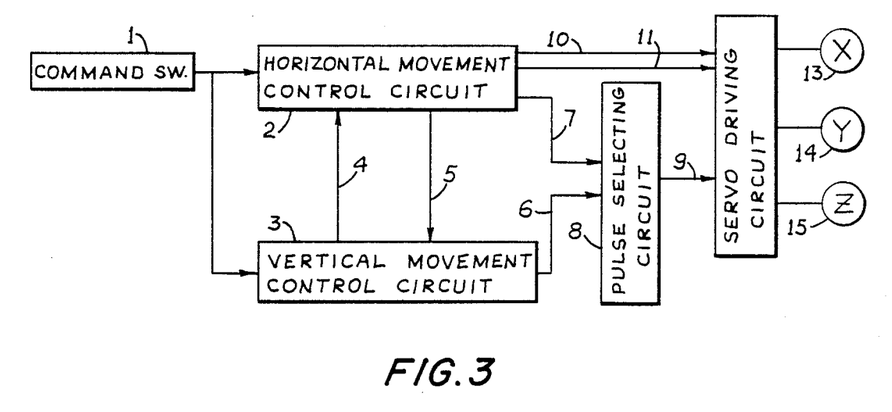
FIG. 3 is a block diagram of an embodiment of the robot control apparatus in accordance with the present invention.

Reference is now made to FIG. 3 in which the control circuit used in the controlling apparatus of the present invention is depicted in a block diagram.

In FIG. 3, in response to a movement command signal initiated by means of a command switch 1, a vertical movement control circuit 3 outputs a Z axis ascending signal which may be a pulse train on connecting line 6. The pulse train passes through a pulse selecting circuit 8 and is then input on connecting line 9 to a servo driving circuit 12. This causes a train of Z axis driving pulses to be applied to Z axis motor 15.

Meanwhile, a horizontal movement control circuit 2, which also receives the movement command signal from command switch 1, does not respond until it receives a timing signal on connecting line 4 from vertical movement control circuit 3 for starting horizontal movement. Control circuit 2 then starts transmitting trains of X axis driving pulses on connecting line 10 and of Y axis driving pulses on line 11. The pulse trains on lines 10 and 11 are both fed to servo drive circuit 12, which supplies drive signals to the X axis 13 and to the Y axis motor 14, as well as feeding Z axis motor 15. When the output of Z axis ascending pulses has been completed, vertical movement control circuit 3 responds to a timing signal on connecting line 5 from horizontal movement control circuit 2, to start the descending movement by outputting Z axis descending pulses on connecting line 6. Descending vertical movement accelerates while horizontal movement decelerates. The descending pulse train, like the ascending pulse train, passes through pulse selecting circuit 8 and is output as a Z axis driving pulse train on line 9, which is fed to servo control circuit 12 for driving Z axis motor 15.

When movements along the X-Y and Z axes are to be simultaneously controlled, a Z axis driving pulse train on connecting line 7 is output from horizontal movement control circuit 2. Pulse selecting circuit 8 selects which of the Z axis driving pulse train signals on lines 6 and 7 is to be input to servo driving circuit 12.

Figure 4:
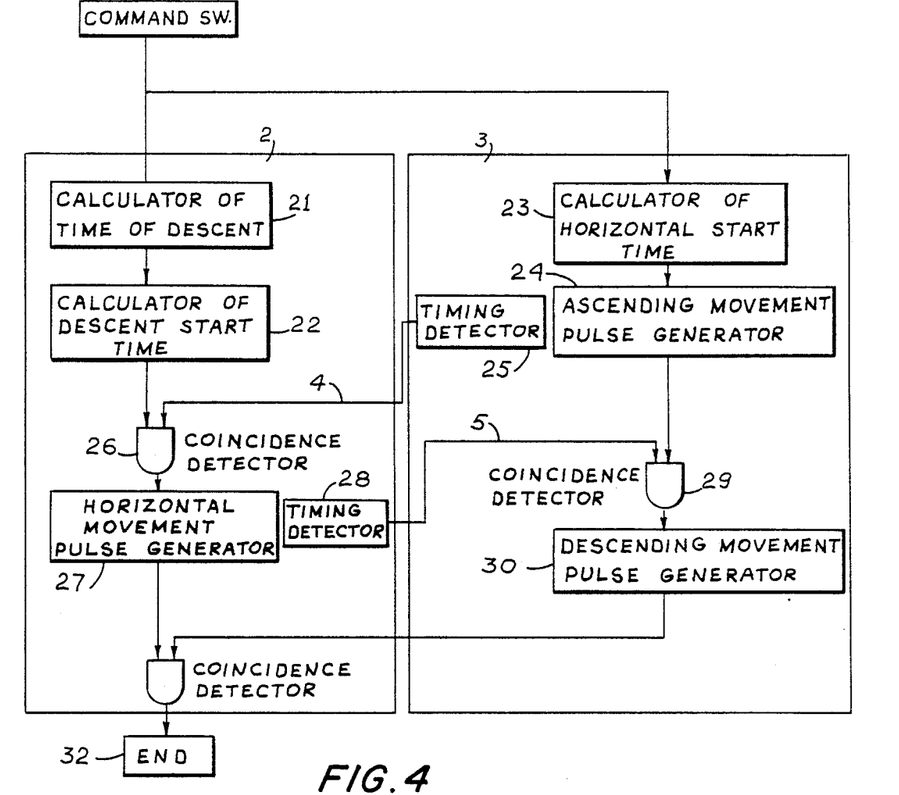
FIG. 4 is a detailed block diagram of the movement control circuits of FIG. 3.
Figure 5:
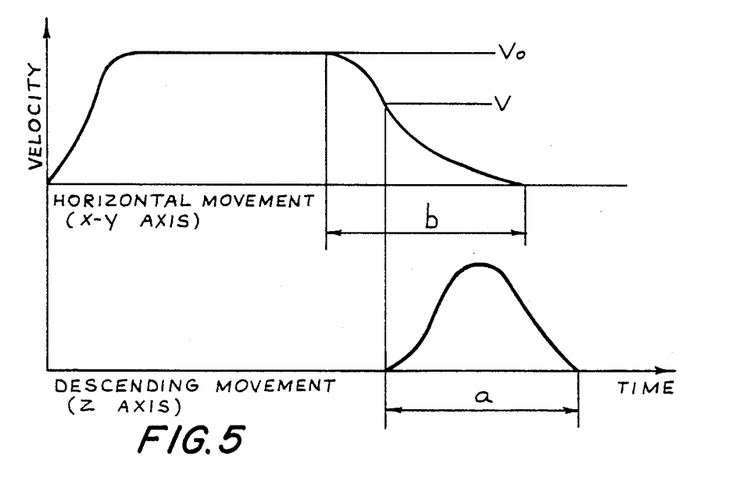
FIGS. 5 and 6, respectively, illustrate different modes of operation of the control circuit of FIG. 4.

Reference is now made to FIG. 4 in which portions of one embodiment of the invention are illustrated by a block diagram which sets forth details of the movement control circuits of FIG. 3. Reference is also made to FIG. 5 which shows a set of velocity curves which are followed by the robot member as it is accelerated and decelerated on the X-Y axes and on the Z axis, respectively.

In response to a move command received from switch 1 by horizontal movement control circuit 2, a descent time calculator 21 determines the time a (FIG. 5) which is required for performance of the desired descending movement, as a function of the required distance of descent, from a predetermined acceleration-deceleration curve which may be stored in a table. The result of the calculation is fed to a velocity calculator 22 which determines a critical horizontal movement velocity v by means of the following formula:

$$v \leq \left(\frac{a}{b} - c\right)v_o, \quad (1)$$

wherein b is the horizontal movement decelerating time which is determined from the predetermined acceleration and deceleration curve and the amount of required horizontal movement, c is a predetermined offset time which is provided so that when horizontal movement has been completed, time is provided for decay of any residual movement in the horizontal direction before the end of movement in the vertical direction, and $v_o$ is the maximum velocity of the horizontal movement. Thus, when horizontal movement has been decelerated to the velocity v, the Z axis descending movement can start.

Formula (1) is obtained by simulating the deceleration curve of the horizontal movement to a straight line. However, the formula should include the time offset c, even when the deceleration curve thereof is simulated by another curve, so long as it does not depart significantly from a straight line.

Figure 6:
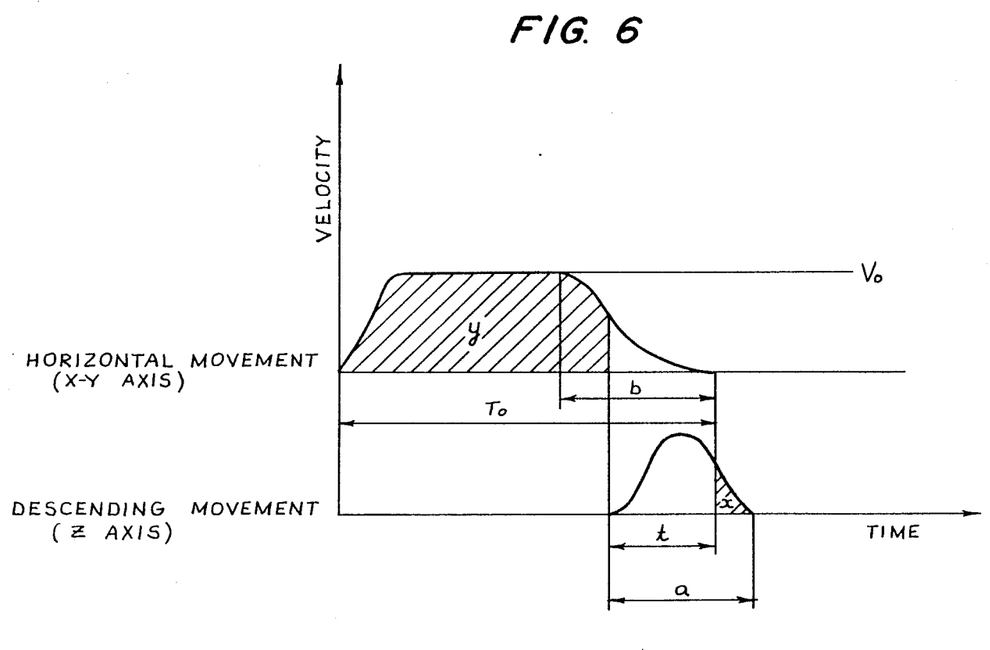

In an alternative embodiment in which the circuit of FIG. 3 follows the velocity curves of FIG. 6, descent time calculator 21 determines the time t required for the member to descend to a point which is above the final destination by an amount x, using the following formula:

$$t = a - d\sqrt{x}, \quad (2)$$

wherein a is the time required for the total descending movement determined from the predetermined acceleration and deceleration curve and the total distance of descent, and d is a constant which is inherent in the acceleration-deceleration curve. Descent start timing calculator 22 calculates the distance y of the horizontal movement to the time when the time remaining before completion of the horizontal movement becomes less than t as calculated by the above formula (2), using the following formula:

$$y = S_o - \frac{v_o}{2b} t^2 + e, \quad (3)$$

wherein $S_o$ is the required amount of horizontal movement, $v_o$ is the maximum velocity of the horizontal movement, b is the decelerating time of the horizontal movement, and e is a constant for offsetting error of simulation.

Formula (3) was obtained by using a straight line approximation of the deceleration curve so as to reduce the calculating time. However, by designating x not entirely arbitrarily, but step-wise, accurate values for y can also be precalculated by the following formula for storage in a table for recovery at the time of execution of the movement command:

$$y = \int_0^{T_o - t} f(t)dt, \quad (4)$$

wherein f(t) is the velocity curve of horizontal movement and $T_o$ is the time required for the full horizontal movement.

Meanwhile, in vertical movement control circuit 3 (FIG. 4), the initial command signal has caused horizontal timing calculator 23 to determine a time for starting the a horizontal movement based on one of (a) the time when acceleration of a vertical movement has been completed, (b) the time when deceleration of a vertical movement has been started, or (c) the time when a predetermined height has been exceeded, and to output a signal for starting the output of a pulse train on line 6 (FIG. 3) from vertical pulse generator 24 for accelerating and decelerating the robot member to raise it in the Z axis direction. During the ascending movement, timing detector 25 responds to the time calculated by horizontal timing calculator 23, and outputs the horizontal movement start timing signal on connecting line 4 (FIG. 3). Then coincidence (determining) detector 26 of horizontal movement control circuit 2 actuates horizontal movement pulse output circuit 27 so as to output the driving pulse trains (on lines 10 and 11) for accelerating and decelerating the robot member on the X-Y axes.

A second timing detector 28 detects when the velocity of horizontal movement has slowed to the velocity calculated by velocity calculator 22 or when the horizontal movement has exceeded a distance calculated by calculator 22, and then outputs a descending movement start signal on connecting line 5. A second coincidence (determining) detector 29 responds to receipt of the descending movement start signal on line 5 and to the signal indicating that the ascending movement has been completed, to actuate descending movement drive pulse generator 30 to feed pulses on accelerating and decelerating the robot member in descent. When the horizontal and vertical movements have both been completed, signals are fed to coincidence (determining) detector 31 which outputs an "end of process" signal 32.

Figure 9A:
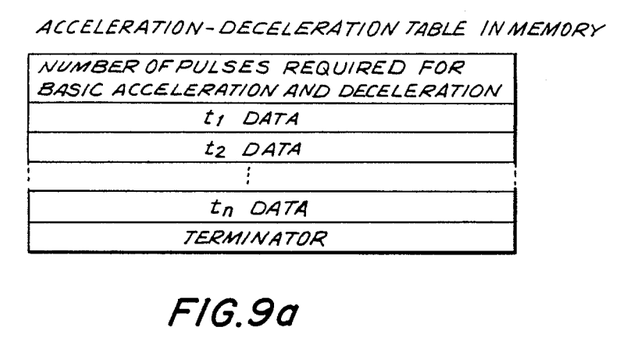
FIG. 9a is a schematic representation of an acceleration-deceleration table.
Figure 9B:
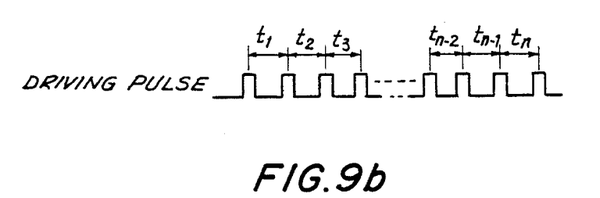
FIG. 9b is a representation of a train of driving pulses.
Figure 9C:
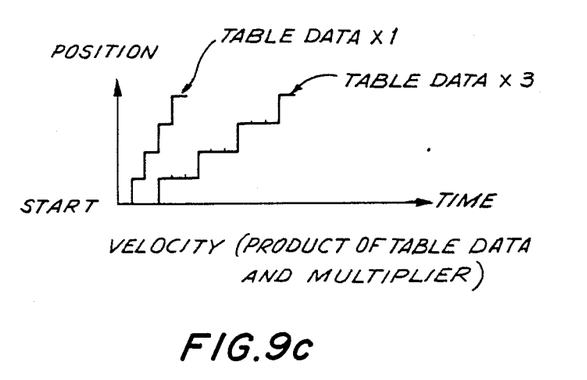

In a working embodiment of the invention, calculation and process functions performed in horizontal movement control circuit 2 and vertical movement control circuit 3 are implemented by means of a microprocessor and movement of the robot member is driven by pulse signals which are produced and spaced apart in accordance with data stored in an acceleration-deceleration table. The table is stored in a memory referred to by the microprocessor. FIG. 9a illustrates such an acceleration-deceleration table in which data for the intervals $t_1, t_2, \ldots t_{n-1}, t_n$ between driving pulses which are used to produce basic acceleration and deceleration movements are stored. The time intervals, as shown in FIG. 9b, separate successive driving pulses, with the values being read out by the microprocessor. To save space, only the basic acceleration and deceleration data need be stored, e.g., data defining the speediest possible acceleration and deceleration. The same data can be referred to a number of times, with the data being multiplied twice, three times or n times to produce a working velocity curve as shown by the curves of FIG. 9c. The number of times the data is referred to by the microprocessor is determined for a particular set-up through simulation, live experiments, and operating experience, taking into consideration various conditions of driving the robot in horizontal and vertical motion, the amount of displacement along the appropriate axis, the inertia of the robot member, and the like.

In the present embodiment, velocity equation (1) is simplified, approximated, and preprocessed substantially to realize a real-time calculation to give a least time data value "t" for the velocity to have decreased below a certain level. Thus, given that a number "i" for referring to the acceleration table for horizontal movement and a number "j" for the descending movement, equation (1) is modified to:

$$t \geq \frac{i}{j} t_o + \alpha, \quad (5)$$

where $b \propto i$, $a \propto j$, $t_o$ is the time data stored in the acceleration-deceleration table at which the speed is maximum, and $\alpha$ is an offset which provides for decay of any residual vibration from horizontal motion which may remain even after the descending movement of the robot member has been completed. The amount of the offset depends on various factors, such as mechanical rigidity, motor torque, delay in the servo driving circuit, the configuration of the acceleration-deceleration curve, etc., and is therefore usually determined by simulation at the time of designing and later, more accurately, by experiment.

By way of example, a value for t is calculated by microprocessor routines functioning as calculator circuits 21 and 22 of horizontal movement control 2, using values such as $i=8$, $j=5$, $t_o=33$, with one clock of the CPU being equal to 0.5 microsec., and with $\alpha=2$. In this example it is assumed that the acceleration-deceleration table represents equal acceleration and deceleration times and that the movement of the robot member is controlled so that horizontal movement is to have been completed when acceleration of the descending movement has been completed, in spite of the fact that the accelerating and decelerating descending movements are faster than those of the horizontal movement. While the driving pulses are being output, a microprocessor routine corresponding to timing detector 28 checks when the value of the acceleration-deceleration table being referred to is above t.

At the same time, the microprocessor is carrying out the functions of vertical movement control 3, and a routine functioning as horizontal start time calculator 23 calculates the time $t_o$ for initiating horizontal movement and, while the ascending drive pulses are being output, another routine performs the function of timing detector 25 to determine when the value referred to in the acceleration-deceleration table attains $t_o$, i.e., when acceleration is complete and maximum speed has been attained; timing signal 4 is then output. As was the case with horizontal movement control 2, the parameters controlling the driving of the robot member are determined by precalculation and by the acceleration-deceleration table.

Figure 7:
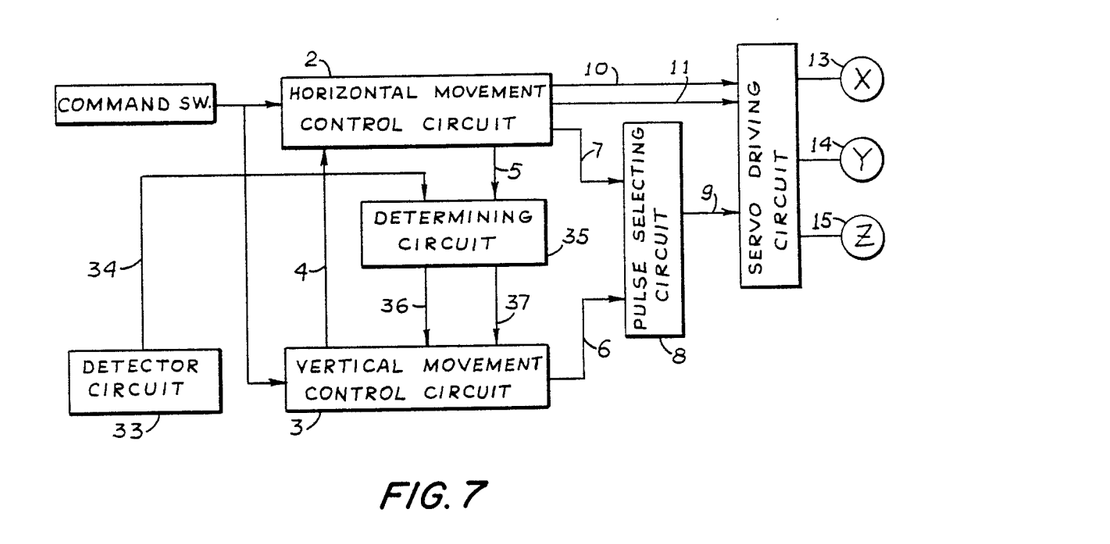
FIG. 7 illustrates a second embodiment of a robot control apparatus in accordance with the teachings of the invention.

In the embodiment of FIG. 7, a determining circuit 35 has been added to the circuit of FIG. 3 for preventing or modifying operation of the drive under certain conditions. To this end, a detector circuit 33 includes a sensor such as a vacuum sensor, for detecting an external fault when the work object is misplaced or when the work object is improperly prepared, etc., and outputs a signal on line 34 to a determining circuit 35. Determining circuit 35 also has the timing signal on line 5 as an input from horizontal movement control circuit 2. Depending upon the presence or absence of a signal on line 34, determining circuit determines, for example, whether a descending movement is to be performed as planned or not. Determining circuit 35 then outputs either to vertical movement control circuit 3 a descending movement start signal on line 36 or a descending movement inhibit signal on line 37. If a descending movement inhibit signal is received, vertical movement control circuit 3 completes a sequence ending operations without allowing the descending movement.

Determining circuit 35 can be realized in the microprocessor which implements vertical movement control circuit 3. Thus, after reference to the acceleration-deceleration table in the robot member driving routine described above, horizontal movement control 2 outputs the timing signal for initiating descending movement and, when vertical movement control 3 receives the timing signal, a determining routine is activated. If the signal on line 34 from detector circuit 33 indicates that no faults have been found, the usual descending driving routine is activated. If, however, there is a fault as reported on connecting line 34, the descending driving routine is not activated. Instead, a false descent termination signal is delivered to horizontal movement control circuit 2 and, at the same time, an error signal indicating that descent motion has not been completely performed is output to a microprocessor sequence which oversees the motion sequences. The state of the stopped robot member can now be determined, e.g., whether the robot member is on path 38 or path 39 of FIG. 8, and a subsequent, appropriate, sequence is thereafter carried out.

Figure 8:
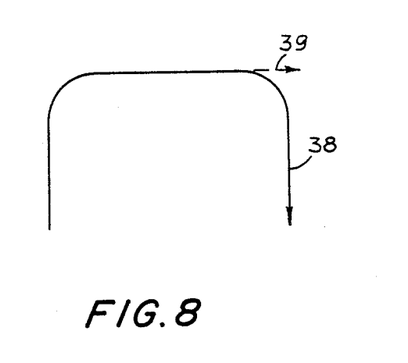
FIG. 8 is a schematic representation of the locus of movement of the tip of a robot member under control of the circuit of FIG. 7.

FIG. 8 shows the path of movement of the tip of the robot member as it is controlled by the control circuit of FIG. 7. Usually the tip of the member travels along the path 38, but when determining circuit 35 causes inhibition of the descending movement because, for example, of an obstruction, the tip of the robot member travels along the dashed line of path 39.

Although the determining circuit and the vertical movement control circuit are shown in FIG. 7 as independent units, it will be apparent to those skilled in the art that it is within the scope of the present invention to incorporate the function of the determining circuit into the vertical movement control circuit.

As described above, by following the teachings of the present invention, the operating time of a robot member can be substantially reduced without unduly increasing the speed of motion of the member along a given axis. Also, in spite of the separate control of the horizontal and vertical movements, damage to work pieces or tools due to dragging or hitching can be avoided because correct timing signals are passed back and forth between respective movement control circuits.

Furthermore, in accordance with the present invention, by changing the locus of movement of the robot member in response to an external input signal from an appropriate detector, the detection and avoidance of an external obstruction can be accomplished without dividing and stopping a pick-and-place operation in midstream.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An apparatus for controlling a robot, the robot comprising a first drive axis for supporting movement of a movable robot member in a first direction and at least one second drive axis for supporting simultaneous movement of the robot member in a second direction, the apparatus comprising:

first movement control means generating a first timing signal when the robot member has attained a predetermined state in its movement through a desired distance in the first direction, the predetermined state being attained before movement in the first direction by the first movement control means is completed;

independent second movement control means responsive to the first timing signal to begin movement of the robot member in the second direction before the control of movement in the first direction by the first movement control means has been completed;

the first movement control means being responsive to a second timing signal to move the robot member in a direction which is opposite to the first direction, the second timing signal being generated by the second movement control means when the robot member has attained a predetermined state in its movement to a desired distance in the second direction, the predetermined state having been attained before movement in the second direction has been completed, whereby movement of the robot member in a direction opposite the first direction is begun before movement in the second direction has been completed;

the first direction being transverse to the second direction and essentially upwardly vertical and the second direction being essentially horizontal; and two second drive axes which support movement of the robot member in two directions which are transverse to the first direction and in which the second movement control means is responsive to the first timing signal to move the robot member in the two traverse directions.

2. An apparatus for controlling a robot, the robot comprising a first drive axis for supporting movement of a movable robot member in a first direction and at least one second drive axis for supporting simultaneous movement of the robot member in a second direction, the apparatus comprising:

first movement control means generating a first timing signal when the robot member has attained a predetermined state in its movement through a desired distance in the first direction, the predetermined state being attained before movement in the first direction by the first movement control means is completed;

independent second movement control means responsive to the first timing signal to begin movement of the robot member in the second direction before the control of movement in the first direction by the first movement control means has been completed; the first direction being transverse to the second direction and essentially upwardly vertical and the second direction is essentially horizontal;

the first movement control means being responsive to a second timing signal to move the robot member in a direction which is opposite to the first direction, the second timing signal being generated by the second movement control means when the robot member has attained a predetermined state in its movement to a desired distance in the second direction, the predetermined state having been attained before movement in the second direction has been completed, whereby movement of the robot member in a direction opposite the first direction is begun before movement in the second direction has been completed; and two second drive axes which support movement of the robot member in two directions which are transverse to the first direction and in which the second movement control means is responsive to the first timing signal to move the robot member in the two transverse directions.

3. An apparatus for controlling a robot, the robot comprising a first drive axis for supporting movement of a movable robot member in a first direction and at least one second drive axis for supporting simultaneous movement of the robot member in a second direction, the apparatus comprising:

first movement control means generating a first timing signal when the robot member has attained a predetermined state in its movement through a desired distance in the first direction, the predetermined state being attained before movement in the first direction by the first movement control means is completed;

independent second movement control means responsive to the first timing signal to begin movement of the robot member in the second direction before the control of movement in the first direction by the first movement control means has been completed;

the first movement control means generating a movement control signal for controlling movement in the first direction and the second movement control means generating a movement control signal for controlling movement in the first direction and a movement control signal for controlling movement in the second direction driving circuit means for moving the robot member in response to the movement control signals; and control signal selecting means having the movement control signals for controlling movement in the first direction as inputs, the control signal selecting means selectively coupling the signal for controlling movement in the first direction from the second movement control means to the driving circuit means instead of the signal from the first movement control means, whereby movement in the first and in the second direction are controlled simultaneously.

4. An apparatus for controlling a robot, the robot comprising a first drive axis for supporting movement of a movable robot member in a first direction and at least one second drive axis for supporting simultaneous movement of the robot member in a second direction, the apparatus comprising:

first movement control means generating a first timing signal when the robot member has attained a predetermined state in its movement through a desired distance in the first direction, the predetermined state being attained before movement in the first direction by the first movement control means is completed;

the first movement control means including first calculator means responsive to a start signal for determining the time required for the robot member to move a desired distance in the second direction;

independent second movement control means responsive to the first timing signal to begin movement of the robot member in the second direction before the control of movement in the first direction by the first movement control means has been completed; and second calculator means for determining a desired reduced level of velocity of movement of the robot member in the first direction at which movement in the second direction is to start in accordance with the formula:

$$v \leq \left(\frac{a}{b} - c\right)v_o,$$

wherein a is the time required for moving the robot member a given distance in the second direction, b is the time required for decelerating movement in the first direction, c is an offset time which provides for decay of residual movement in the first direction before the end of movement in the second direction, and $v_o$ is the maximum velocity of movement in the first direction.

5. An apparatus for controlling a robot, the robot comprising a first drive axis for supporting movement of a movable robot member in a first direction and at least one second drive axis for supporting simultaneous movement of the robot member in a second direction, the apparatus comprising:

first movement control means generating a first timing signal when the robot member has attained a predetermined state in its movement through a desired distance in the first direction, the predetermined state being attained before movement in the first direction by the first movement control means is completed;

the first movement control means including first calculator means responsive to a start signal for determining the time t required for movement of the robot member in the second direction to a point which is a predetermined distance x from the desired position, in accordance with the formula:

$$t = a - d\sqrt{x},$$

where a is the time required for movement of the robot member in the second direction to the desired position calculated in accordance with a predetermined acceleration-deceleration curve, and d is a constant inherent in the acceleration-deceleration curve and;

independent second movement control means responsive to the first timing signal to begin movement of the robot member in the second direction before the control of movement in the first direction by the first movement control means has been completed.

6. An apparatus for controlling a robot, the robot comprising a first drive axis for supporting movement of a movable robot member in a first direction and at least one second drive axis for supporting movement of the robot member in a second direction, the apparatus comprising:

first movement control means for moving the robot member in the first direction, the first movement control means generating a first timing signal when the robot member has attained a predetermined state in its movement through a desired distance in the first direction, the predetermined state being attained before movement in the first direction is completed; and independent second movement control means responsive to the first timing signal to begin movement of the robot member in the second direction before movement in the first direction has been completed;

the first movement control means being responsive to a second timing signal to move the robot member in a direction which is opposite to the first direction, the second timing signal being generated by the second movement control means when the robot member has attained a predetermined state in its movement to a desired distance in the second direction, the predetermined state having been attained before movement in the second direction has been completed, whereby movement of the robot member in a direction opposite the first direction is begun before movement in the second direction has been completed;

the first movement control means moving the robot member in a vertical direction and the second movement control means moving the robot member in a horizontal direction, and further comprising:

first calculator means in the second control means for calculating the time required for descent of the robot member by a desired amount;

second calculator means in the second control means having the time calculated by the first calculator means as an input, the second calculator means providing a start signal when the robot member has attained a predetermined state in its horizontal movement;

third calculator means in the first movement control means for calculating when the robot member has attained a predetermined state in its vertical movement;

first timing means providing a timing signal when the robot member has attained the predetermined state of the first movement control means and further comprising:

first detector means responsive to the timing signal from the first timing means, the first detector means providing a timing signal for initiating movement of the robot member in the horizontal direction;

first coincidence detector means having the timing signal from the first detector means and the start signal from the second calculator means as inputs, the first coincidence detector means providing a control signal output and;

horizontal signal generator means responsive to the control signal from the first coincidence detector means to provide a control signal for driving the robot member in the horizontal direction.

7. The robot control apparatus of claim 6 wherein the signal generator means provides a completion signal when upward movement of the robot member has been completed and further comprising:

second coincidence detector means having the start signal from the second detector means and the completion signal as inputs, the second coincidence detector means providing an output signal.

8. The robot control apparatus of claim 7 and further comprising:

vertical signal generator means responsive to the output signal from the second coincidence detector means to provide a vertical control signal for driving the robot member downward.

9. The robot control apparatus of claim 8 and further comprising:

coincidence means responsive to completion of the horizontal control signal and of the vertical control signal to stop movement of the apparatus.

10. An apparatus for controlling a robot, the robot comprising a first drive axis for supporting movement of a movable robot member in a first direction and at least one second drive axis for supporting movement of the robot member in a second direction, the apparatus comprising:

first movement control means for moving the robot member in the first direction, the first movement control means generating a first timing signal when the robot member has attained a predetermined state in its movement through a desired distance in the first direction, the predetermined state being attained before movement in the first direction is completed;

independent second movement control means responsive to the first timing signal to begin movement of the robot member in the second direction before movement in the first direction has been completed;

first calculator means for determining the time required for movement of the robot member a desired distance in the second direction in accordance with a predetermined acceleration-deceleration curve;

the first calculator means comprising a microprocessor and the predetermined acceleration-deceleration curve comprising a data table containing drive control signal information which is stored in memory and is referred to by the microprocessor, and;

second calculator means in the microprocessor for providing a time t at which movement of the robot arm in the first direction will have attained a desired velocity at which movement in the second direction is to start in accordance with the formula;

$$t \geq \frac{i}{j} t_o + \alpha$$

where i is a predetermined number for referring to drive control signal data in the data table for generating a control signal for acceleration in the first direction, j is a predetermined number for referring to drive control signal data in the data table for generating a control signal for acceleration in the second direction, $t_o$ is the time data for obtaining maximum velocity stored in the acceleration-deceleration table, and $\alpha$ is an offset time which provides for decay of residual movement in the first direction before the end of movement in the second direction.

11. An apparatus for controlling a robot, the robot comprising a first drive axis for supporting movement of a movable robot member in a first direction and at least one second drive axis for supporting movement of the robot member in a second direction, the apparatus comprising:

first movement control means for moving the robot member in the first direction, the fist movement control means generating a first timing signal when the robot member has attained a predetermined state in its movement through a desired distance in the first direction, the predetermined state being attained before movement in the first direction is completed; and independent second movement control means responsive to the first timing signal to begin movement of the robot member in the second direction before movement in the first direction has been completed;

the first direction being essentially upwardly vertical and the second direction being essentially horizontal; and two second drive axis which support movement of the robot member in two directions which are transverse to the first direction and in which the second movement control means is responsive to the first timing signal to move the robot member in the two transverse directions.

12. The robot control apparatus of claim 11 in which the first movement control means further comprises:

first calculator means responsive to a start signal for determining the time required for the robot member to move a desired distance in the second direction.

13. The robot control apparatus of claim 11 in which the first movement control means further comprises:

first calculator means for determining the time required for movement of the robot member a desired distance in the second direction in accordance with a predetermined acceleration-deceleration curve.

14. The robot control apparatus of claim 13 in which the first control means further comprises:

second calculator means for establishing a desired reduced level of velocity of movement of the robot member in the first direction, the calculator means having as an input the time calculated by the first calculator means.

15. The robot control apparatus of claim 14 in which the second movement control means responds to an inhibit signal to change a planned movement of the robot member, and further comprising:

detecting means for detecting a malfunction which is external of the robot control apparatus, the detecting means outputting a malfunction signal in response thereto; and determining means having the malfunction signal and the timing signal from the first movement control means as inputs, the determining means providing an inhibit signal to the second direction movement control circuit means when a malfunction is present.

16. The robot control apparatus of claim 11 in which functions of first movement control means and the second movement control means are carried out in a microprocessor and further comprising:

means for detecting a malfunction external to the robot control apparatus to output a malfunction signal; and determining means in the microprocessor having the malfunction signal and the timing signal from the second movement control means as inputs, the determining means transmitting the timing signal to the first movement control means to enable movement in the opposite direction when a malfunction signal is not present.

17. The robot control apparatus of claim 16 wherein the microprocessor comprises a movement sequence control routine and wherein the determining means responds to the malfunction signal by not enabling movement in the opposite direction and by transmitting an error signal to the movement sequence control routine to initiate an end of operation sequence.

18. An apparatus for controlling a robot, the robot comprising a first axis for supporting movement of a robot member in a vertical direction and at least one second axis for supporting simultaneous movement of the robot member in a horizontal direction, the apparatus comprising:

vertical movement control means for controlling movement of the robot member in a vertical direction, the vertical movement control means providing a first timing signal at a time before an ascending movement of the robot member by the vertical movement control means has been completed, the vertical movement control means being responsive to a second timing signal to move the robot member in a descending direction;

independent horizontal movement control means responsive to the first timing signal to begin movement of the robot member in a horizontal direction, the horizontal control circuit providing the second timing signal at a time before movement of the robot member in the horizontal direction by the horizontal movement control means is completed, whereby descending movement of the robot member is initiated;

means for estimating the time required for descending movement of the robot member;

means for calculating a velocity of horizontal movement such that the time remaining before completion of the horizontal movement is less than the estimated time required for descent of the robot member; and means responsive to detection of deceleration of the velocity of horizontal movement of the robot member to the calculated velocity of horizontal movement to provide the second timing signal.

19. The robot control apparatus of claim 18 and further comprising:

means for estimating the time required for the robot member to descend to a desired height;

means for calculating a distance of horizontal movement of the robot member toward a desired location such that the time required for completion of the horizontal movement is less than the estimated time for descent of the robot member; and means responsive to detection of motion of the robot member over the calculated horizontal distance to provide the second timing signal.

20. The robot control circuit of claim 18 wherein one of the vertical movement control means and the horizontal movement control means is adapted to control movement of the robot arm on both axes.

21. The robot control circuit of claim 18 and further comprising:

means for detecting a fault condition external to the robot; and determining means having the second timing signal and the signal from the detecting means as inputs, the determining means inhibiting transmission of the second timing signal to the vertical control means, whereby descent of the robot member is prevented.

22. An apparatus for controlling a robot, the robot comprising a first drive axis for supporting movement of a movable robot member in a first direction and at least one second drive axis for supporting movement of the robot member in a second direction, the apparatus comprising:

first movement control means for moving the robot member in the first direction, the first movement control means generating a first timing signal when the robot member has attained a predetermined state in its movement through a desired distance in the first direction, the predetermined state being attained before movement in the first direction is completed; and independent second movement control means responsive to the first timing signal to begin movement of the robot member in the second direction before movement in the first direction has been completed;

the first movement control means being responsive to a second timing signal to move the robot member in a direction which is opposite to the first direction, the second timing signal being generated by the second movement control means when the robot member has attained a predetermined state in its movement to a desired distance in the second direction, the predetermined state having been attained before movement in the second direction has been completed, whereby movement of the robot member in a direction opposite the first direction is begun before movement in the second direction has been completed; and there are two second drive axes which support movement of the robot member in two directions which are transverse to the first direction and in which the second movement control means is responsive to the first timing signal to move the robot member in the two transverse directions.

23. An apparatus for controlling a robot, the robot comprising a first drive axis for supporting movement of a movable robot member in a first direction and at least one second drive axis for supporting movement of the robot member in a second direction, the apparatus comprising:

first movement control means for moving the robot member in the first direction, the first movement control means generating a first timing signal when the robot member has attained a predetermined state in its movement through a desired distance in the first direction, the predetermined state being attained before movement in the first direction is completed;

independent second movement control means responsive to the first timing signal to begin movement of the robot member in the second direction before movement in the first direction has been completed; and the first movement control means generates a movement control signal for controlling movement in the first direction and the second movement control means generates a movement control signal for controlling movement in the first direction and a movement control signal for controlling movement in the second direction, the robot control apparatus further comprising:

driving circuit means for moving the robot member in response to the movement control signals; and control signal selecting means having the movement control signals for controlling movement in the first direction as inputs, the control signal selecting means selectively coupling the signal for controlling movement in the first direction from the second movement control means to the driving circuit means instead of the signal from the first movement control means, whereby movement in the first and in the second direction are controlled simultaneously.

24. An apparatus for controlling a robot, the robot comprising a first drive axis for supporting movement of a movable robot member in a first direction and at least one second drive axis for supporting movement of the robot member in a second direction, the apparatus comprising:

first movement control means for moving the robot member in the first direction, the first movement control means generating a first timing signal when the robot member has attained a predetermined state in its movement through a desired distance in the first direction, the predetermined state being attained before movement in the first direction is completed;

independent second movement control means responsive to the first timing signal to begin movement of the robot member in the second direction before movement in the first direction has been completed;

and the first movement control means further comprises:

first calculator means responsive to a start signal for determining the time required for the robot member to move a desired distance in the second direction; and second calculator means for determining a desired reduced level of velocity of movement of the robot member in the first direction at which movement in the second direction is to start in accordance with the formula:

$$v \leq (a/b - c) v_o$$

wherein a is the time required for moving the robot member a given distance in the second direction, b is the time required for decelerating movement in the first direction, c is an offset time which provides for decay of residual movement in the first direction before the end of movement in the second direction, and $v_o$ is the maximum velocity of movement in the first direction.

25. The robot control apparatus of claim 24 wherein the time b is calculated in accordance with a predetermined acceleration-deceleration curve.

26. An apparatus for controlling a robot, the robot comprising a first drive axis for supporting movement of a movable robot member in a first direction and at least one second drive axis for supporting movement of the robot member in a second direction, the apparatus comprising:

first movement control means for moving the robot member in the first direction, the first movement control means generating a first timing signal when the robot member has attained a predetermined state in its movement through a desired distance in the first direction, the predetermined state being attained before movement in the first direction is completed;

independent second movement control means responsive to the first timing signal to begin movement of the robot member in the second direction before movement in the first direction has been completed;

the first movement control means further comprising:

first calculator means for determining the time required for movement of the robot member a desired distance in the second direction in accordance with a predetermined acceleration-deceleration curve; and second calculator means for establishing a desired reduced level of velocity of movement of the robot member in the first direction, the calculator means having as an input the time calculated by the first calculator means.

27. An apparatus for controlling a robot, the robot comprising a first drive axis for supporting movement of a movable robot member in a first direction and at least one second drive axis for supporting movement of the robot member in a second direction, the apparatus comprising:

first movement control means for moving the robot member in the first direction, the first movement control means generating a first timing signal when the robot member has attained a predetermined state in its movement through a desired distance in the first direction, the predetermined state being attained before movement in the first direction is completed;

independent second movement control means responsive to the first timing signal to begin movement of the robot member in the second direction before movement in the first direction has been completed;

and the first movement control means further comprising:

first calculator means responsive to a start signal for determining the time t required for movement of the robot member in the second direction to a point which is a predetermined distance x from the desired position, in accordance with the formula:

$$t = a - d\sqrt{x}$$

where a is the time required for movement of the robot member in the second direction to the desired position calculated in accordance with a predetermined acceleration-deceleration curve, and d is a constant inherent in the acceleration-deceleration curve.

28. The robot control apparatus of claim 27 in which the first movement control means further comprises:

second calculator means for determining the distance y which the robot member will have travelled in the first direction prior to a given time before completion of movement in the first direction at which the remaining time before completion is less than the time t, in accordance with the formula:

$$y = S_o - \frac{v_o}{2b} t^2 + e,$$

where $S_o$ is the desired distance to be moved in the first direction, $v_o$ is the maximum velocity of movement in the first direction, b is the decelerating time of movement in the first direction, and e is an offset amount for offsetting the error of simulation.

29. The control apparatus of claim 27 in which the first movement control means further comprises:

second calculator means for determining a distance y which the robot member will have moved in the first direction at a given time before completion of movement in the first direction at which the remaining time before completion is less than the time t, in accordance with a table, the table comprising the values of y calculated in accordance with the formula:

$$y = \int_0^{T_o - t} f(t)dt,$$

where $T_o$ is the time required for movement to the desired position in the first direction and f(t) is the velocity curve of movement in the first direction.

30. An apparatus for controlling a robot, the robot comprising a first axis for supporting movement of a robot member in a vertical direction and at least one second axis for supporting simultaneous movement of the robot member in a horizontal direction, the apparatus comprising:

vertical movement control means for controlling movement of the robot member in a vertical direction, the vertical movement control means providing a first timing signal at a time before an ascending movement of the robot member by the vertical movement control means has been completed, the vertical movement control means being responsive to a second timing signal to move the robot in a descending direction;

independent horizontal movement control means responsive to the first timing signal to begin movement of the robot member in a horizontal direction, the horizontal control circuit providing the second timing signal at a time before movement of the robot member in the horizontal direction by the horizontal movement control means is completed, whereby descending movement of the robot member is initiated;

means for estimating the time required for descending movement of the robot member; means for calculating a velocity of horizontal movement such that the time remaining before completion of the horizontal movement is less than the estimated time required for descent or the robot member;

means responsive to detection of deceleration of the velocity of horizontal movement of the robot member to the calculated velocity of horizontal movement to provide the second timing signal; and one of the vertical movement control means and the horizontal control means being adapted to control movement of the robot arm on both axes.

* * * * *